Feb. 22, 1966  A. W. HARRISON  3,236,336
MEANS FOR ACTUATING A FRICTION PAD IN A DISC BRAKE
Filed March 9, 1964  5 Sheets-Sheet 1
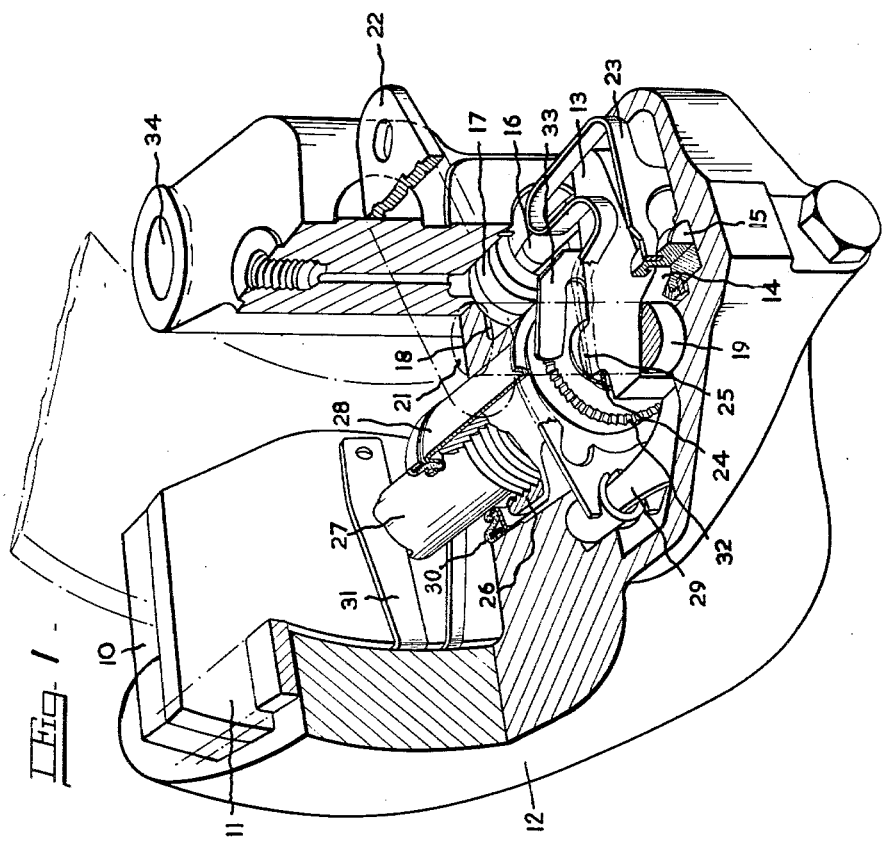
ANTHONY W. HARRISON

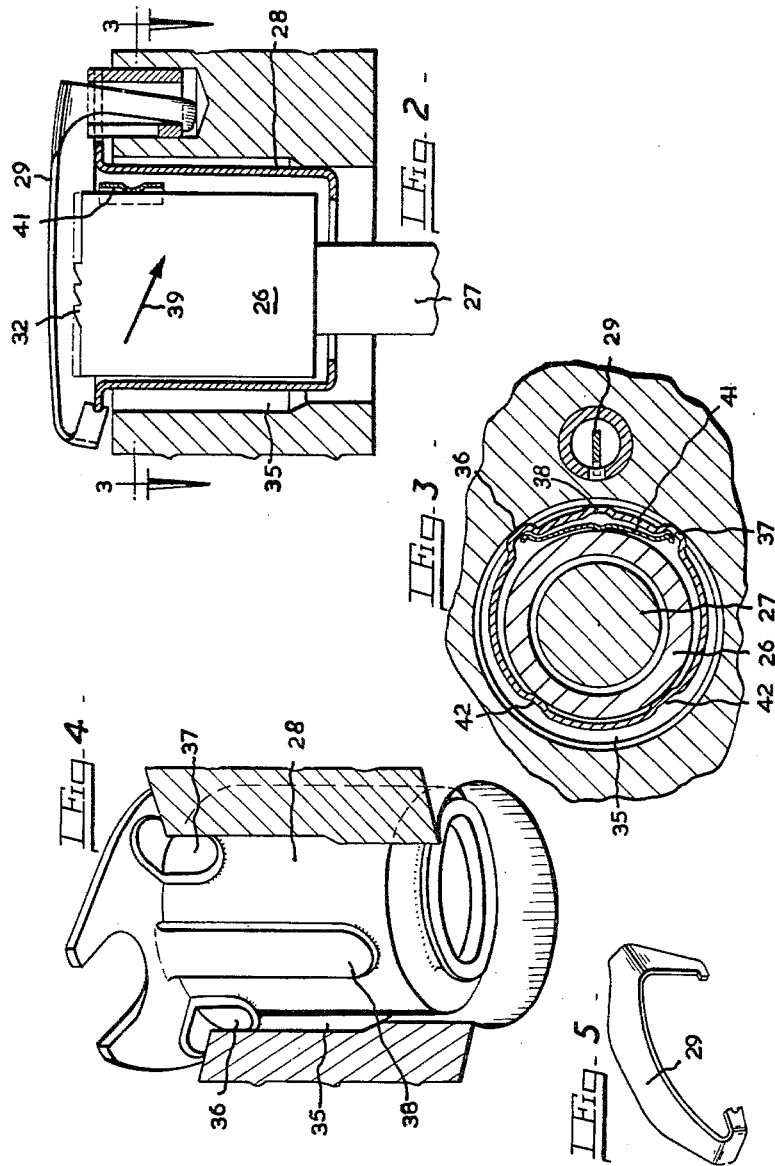

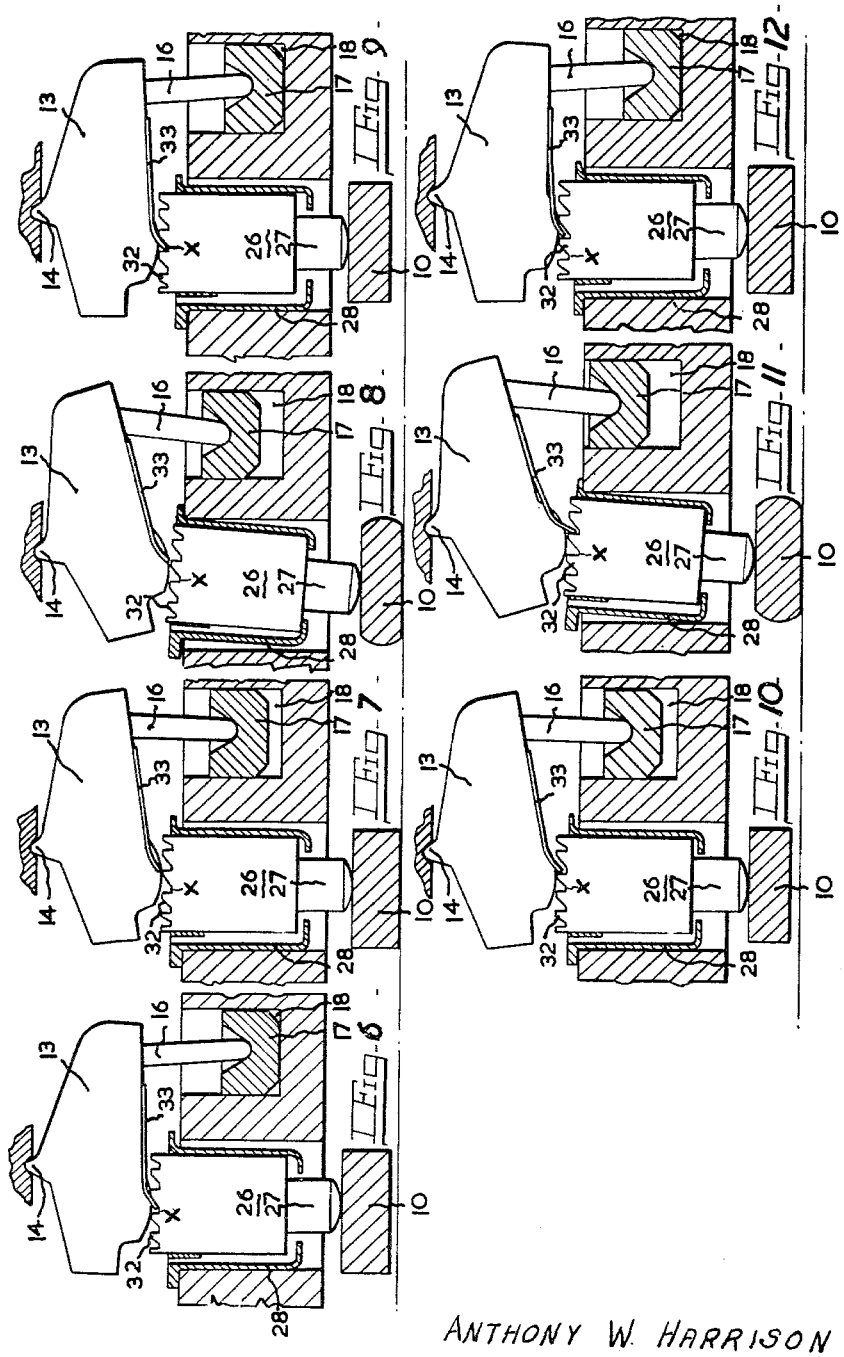

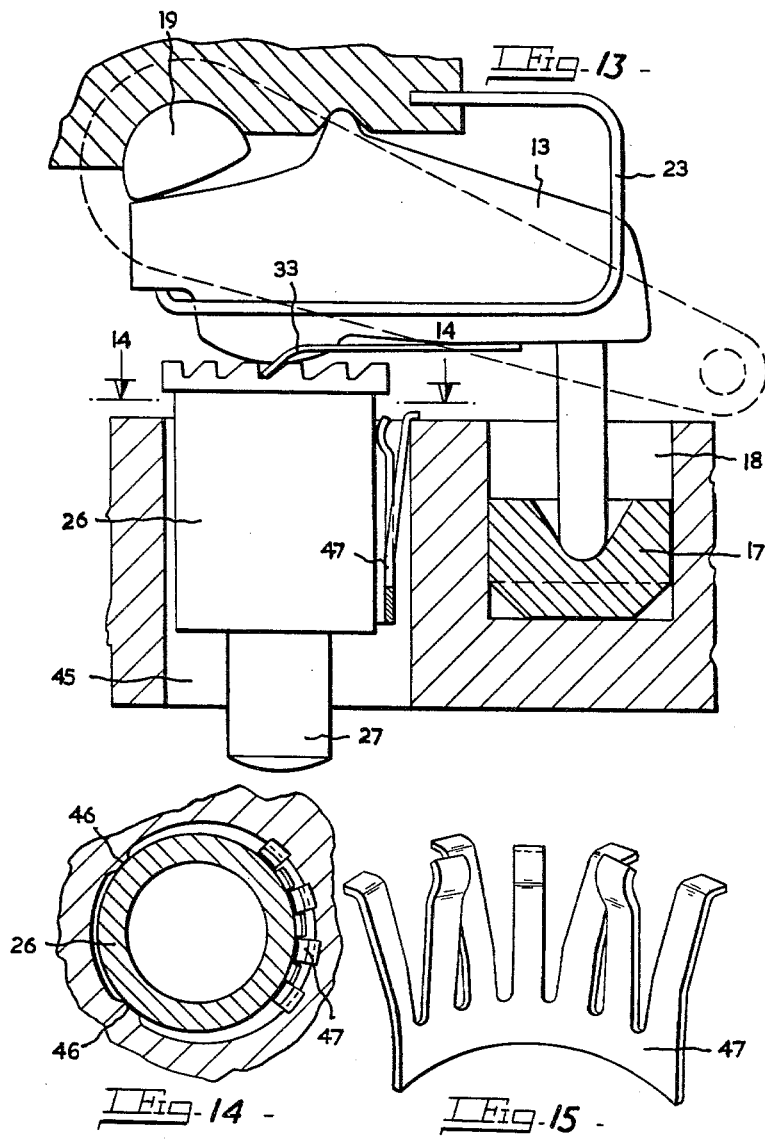

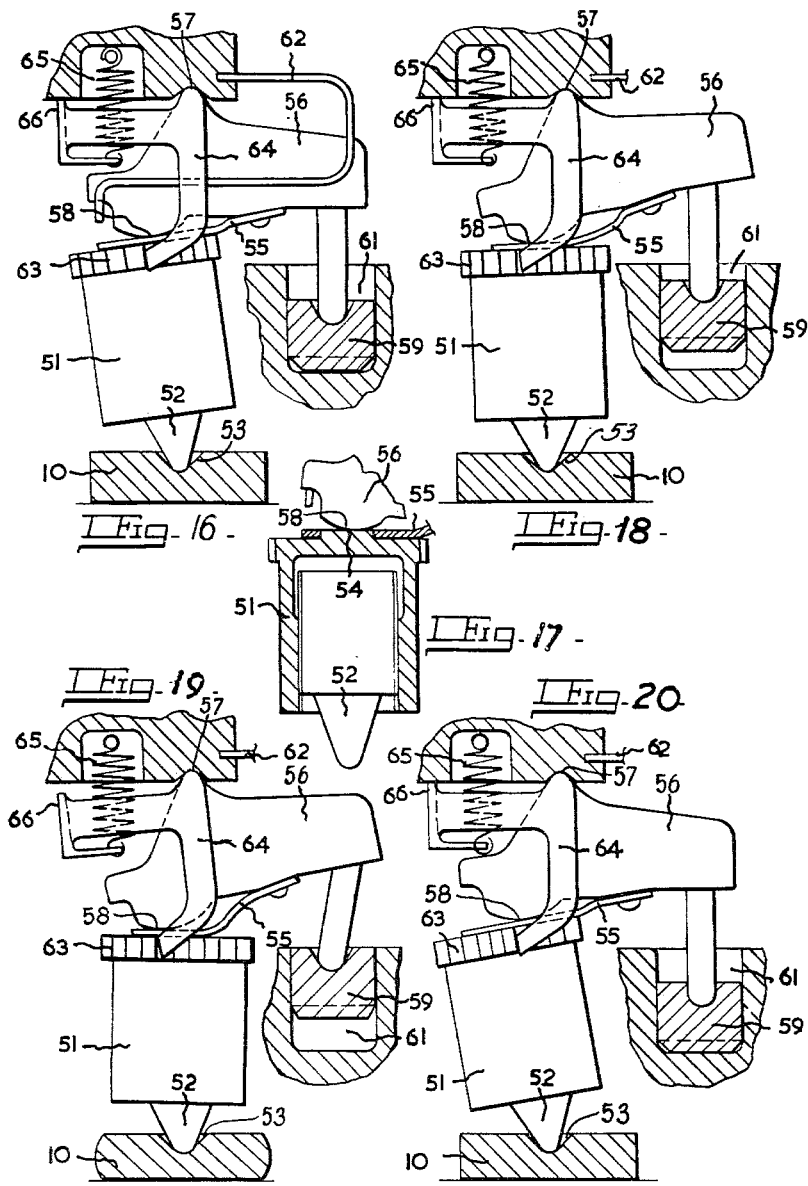

United States Patent Office 3,236,336
Patented Feb. 22, 1966

3,236,336
MEANS FOR ACTUATING A FRICTION PAD IN A DISC BRAKE
Anthony William Harrison, Birmingham, England, assignor to Girling Limited, Birmingham, England, a British company
Filed Mar. 9, 1964, Ser. No. 350,156
Claims priority, application Great Britain, Mar. 16, 1963, 6,380/63, 10,506/63
10 Claims. (Cl. 188—73)

This invention relates to improvements in brake actuating mechanism for brakes of the kind in which a friction pad is applied to a rotatable disc by an angularly movable lever which may be actuated by hydraulic or mechanical means or both.

According to one feature of our invention a friction pad or shoe is applied to a rotatable disc by a rigid rocking lever which is angularly movable by actuating means about a stationary fulcrum or pivot and engages and acts on a thrust member which bears on the friction pad and of which at least the end engaged by the lever is movable in a direction transverse to the line of action of the lever on the thrust member.

In one form of our invention the engagement between the lever and the thrust member in the initial part of the application of the brake is a sliding one but as the resistance to exial movement of the thrust member increases after the friction pad is in contact with the disc the engagement becomes substantially a rolling one so that the load is applied with maximum efficiency.

In another form the lever is in rolling engagement with the thrust member throughout its movement and the thrust member rocks about its point of engagement with the friction pad.

According to a further feature of our invention the thrust member is adjustable in length, as for example by forming it in two telescopic parts in screw-threaded engagement with each other, one part being held against rotation and the other being rotated step-by-step through ratchet and pawl or other mechanism when the movement of a part of the mechanism in the application or release of the brake exceeds a predetermined value so that the clearance between the pad or shoe and the rotable member is maintained substantially constant.

The adjustment may be effected by relative sliding movement between the lever and the thrust member in the initial part of the application of the brake, there being no relative sliding movement after the friction pad has been brought into engagement with the disc and the thrust member is under load so that the adjustment is not sensitive to deformation of any part of the brake under load. The adjustment may be arranged to take place either during the brake-applying or brake-releasing movements of the mechanism.

In an alternative arrangement in which the lever is in rolling engagement with the thrust member throughout its movement the adjustment may be effected by the engagement with ratchet teeth on the thrust member of a spring-loaded pawl pivoting about a fixed point independently of the lever.

According to another feature of our invention the engagement between the lever and the thrust member is so arranged that as the lever moves angularly about its fulcrum the line of action between the lever and the thrust member moves relative to the lever fulcrum or pivot to vary the velocity ratio between the actuator and the friction pad or shoe.

When the brake is applied the first part of the movement of the friction pad or shoe brings it into engagement with the rotatable member and the next part of the movement takes up all the elastic yield in the transmission and applies the friction pad or shoe with a force which is a function of the rate of deceleration, and the velocity ratio of the transmission between the brake pedal or lever and the friction pad or shoe is also a function of the rate of deceleration.

The arrangement may be such that the brakes on the front wheels of a vehicle are applied through means of which the velocity ratio increases with rate of deceleration to compensate for the transfer of weight from the rear wheels to the front while the brakes on the rear wheels are applied through means of which the velocity ratio remains constant.

Alternatively the brakes on the front wheels may be applied through means of which the velocity ratio is constant while the brakes on the rear wheels are applied through means of which the velocity ratio decreases with rate of deceleration, or the arrangement may be such that the velocity ratio of the means through which the front brakes are applied increases while that of the means through which the rear brakes are applied decreases.

The rocking lever may be actuated by a piston working in an hydraulic cylinder and acting on the lever through a pivoted dolly or the like or it may be actuated by a cam or other mechanical means or by both hydraulic and mechanical actuating means.

Some embodiments of our invention are illustrated by way of example in the accompanying drawings in which:

FIGURE 1 is a diagrammatic perspective view partly in section of one form of brake actuating mechanism for a disc brake;

FIGURE 2 is a longitudinal section of the thrust member assembly of the mechanism shown in Figure 1;

FIGURE 3 is a transverse section on the line 3—3 of FIGURE 2;

FIGURE 4 is a perspective view of the shell part of the thrust member assembly;

FIGURE 5 is a perspective view of the spring by which the shell part is loaded;

FIGURES 6 to 12 are diagrammatic views showing successive positions of the mechanism in the application and release of the brake;

FIGURE 13 is a diagrammatic section of another form of brake actuating mechanism;

FIGURE 14 is a fragmentary transverse section on the line 14—14 of FIGURE 13;

FIGURE 15 is a perspective view of a spring incorporated in the mechanism shown in FIGURE 13;

FIGURE 16 is a diagrammatic view of another form of actuating mechanism;

FIGURE 17 is a section of the thrust member incorporated in the mechanism shown in FIGURE 16; and FIGURES 18, 19 and 20 are views similar to FIGURE 16 showing successive positions of the mechanism in the application and release of the brake.

The actuating mechanism shown diagrammatically in perspective in FIGURE 1 is designed for applying to a rotatable disc a friction pad 10 mounted on a rigid backing plate 11 which is guided for movement towards and away from the disc in a caliper 12 straddling a portion of the periphery of the disc. A rigid rocking lever 13 is mounted in the caliper for angular movement about a stationary fulcrum formed by a wedge shaped lug 14 on the outer side of the lever and having an end of small radius which is received in a notch in a hardened steel block 15 mounted in the end cover of the caliper. One end of the lever is engaged by the piston-rod 16 of a piston 17 working in an hydraulic cylinder 18 of which the axis is at right angles to the plane of the disc. The outer end of the piston-rod is in rocking engagement with a tapered notch or recess in the lever. The other end of the lever is engaged by a cam 19 on a shaft 21 carrying an arm 22 adapted to be connected to a hand lever or the like for applying the brake mechanically. The hydraulic piston and the cam both move the lever angularly in the same direction. The lever is normally held in the off position by a spring 23 which is fixed at one end to the caliper and at the other end has a finger 24 bearing on the inner side of the lever at the end cooperating with the cam 19.

An arcuate boss 25 on the inner face of the lever is adapted to engage a flat or convex face on the outer end of a sleeve nut 26 of which the axis is substantially at right angles to the plane of the disc. The sleeve nut is screw-threaded internally and screwed into it is a plunger 27 of which the radiused inner end bears on the backing plate 11, the sleeve nut and plunger forming a thrust member of adjustable length between the lever and the friction pad assembly. The thrust member is mounted in a cylindrical shell 28 in a manner described in more detail below which permits transverse movement of the thrust member, or at least of its outer end, against resilient resistance. The shell is loaded by a spring 29 which resiliently resists transverse movement of the assembly in the direction of movement of the boss 21 on the lever in the application of the brake.

The inner end of the shell 28 is closed by an annular rubber boot 30 to exclude dirt and water. The inner end of the plunger 27 carries a clip 31 which engages with an edge of the backing plate 11 to hold the plunger against rotation.

The outer end of the sleeve nut is formed with a ring of ratchet teeth 32 co-operating with a pawl tooth or finger 33 mounted on the lever, the ratchet teeth being substantially in the plane of the end face of the sleeve nut.

When the lever 13 is moved angularly about its fulcrum by the hydraulic piston 17 or the cam 19 it moves the thrust member axially to apply the friction pad 10 to the disc. The caliper is mounted to swing about an axis 34 substantially at right angles to the axis of the disc, and the reaction on the caliper brings a second friction pad carried by the caliper into engagement with the opposite face of the disc.

During the first part of the movement of the lever the arcuate boss 25 slides over the outer end of the sleeve nut while the thrust member continues to be held by the spring 29 against transverse movement. When the friction pad 10 has been brought into engagement with the disc the resistance to the axial movement of the thrust member increases so that the friction between the lever and the thrust member increases. This causes the outer end of the thrust member to move transversely against the resilient resistance offered by the spring 29 and the boss 25 rolls on the outer end of the sleeve nut instead of sliding so that the load is applied with maximum efficiency.

During the first part of the lever movement there is relative sliding movement between the pawl 33 on the lever and the outer end of the sleeve nut. If adjustment is required to compensate for wear of the friction pad the movement will be sufficient to cause the pawl to ride over one or more of the ratchet teeth. During the next part of the movement after the friction pad has been brought into engagement with the disc the outer end of the thrust member moves with the lever so that there is no appreciable further relative sliding movement between the pawl and the ratchet teeth and the adjustment is not affected by deformation of the brake caliper by the braking load.

On release of the brake the pawl, if it has been carried over one or more of the ratchet teeth, will take the sleeve nut with it as the lever is returned to its normal position by the spring 23 and the sleeve nut will be rotated relative to the plunger 27 to increase the effective length of the thrust member by an amount corresponding to the wear of the friction pad which has necessitated the adjustment.

When the friction pad has worn to such an extent to require replacement the pad with its backing plate can be withdrawn from the caliper and then the plunger 27 can be screwed back into the sleeve nut before the new pad assembly is fitted.

The thrust member assembly is shown in more detail in FIGURES 2, 3, 4 and 5.

As will be seen from these figures the shell 28 is housed in a bore 35 in the caliper of substantially greater diameter than the shell. One side of the shell is formed with three raised portions 36, 37, 38 forming location points. The portions 36 and 37 are angularly spaced and lie at the outer end of the shell while the portion 38 lies between them adjacent to the inner end of the shell. The spring 29 holds these location points normally in engagement with abutments in the bore 35 as shown in FIGURES 2 and 3, the line of action of the spring being indicated by the arrow 39. The sleeve nut 26 is of smaller diameter than the shell and a blade spring 41 located between the nut and shell normally holds the shell in engagement with angularly spaced longitudinal ribs 42 in the shell on the opposite side to the location points. The spring 41 provides a certain amount of frictional resistance to rotation of the sleeve nut within the shell and holds the nut against inertia forces due to suspension movements of the vehicle wheel or axle.

FIGURES 6 to 12 show diagrammatically the sequence of operations in the normal application and release of the brake.

FIGURE 6 shows the mechanism with the parts in their normal "off" positions.

When fluid under pressure is supplied to the hydraulic cylinder 18 the piston 17, through the piston rod 16, rocks the lever 13 about its fulcrum to bring the friction pad 10 into engagement with the brake disc as shown in FIGURE 7, the boss 25 on the lever sliding over the outer end of the thrust member.

After the friction pad has been brought into engagement with the disc the resistance to further axial movement of the thrust member increases with consequent increase in the friction between the lever and the thrust member. In the next part of the applying movement the boss 25 rolls on the outer end of the thrust member which moves transversely as shown in FIGURE 8, the thrust member rocking about its point of engagement with the friction pad.

On release of the pressure in the hydraulic cylinder the parts return to their initial positions as shown in FIGURE 9.

It will be noted that in this sequence the movement of the lever relative to the thrust member between the positions shown in FIGURES 6 and 7 has not been sufficient to carry the pawl 33 over a ratchet tooth and on release of the brake the pawl is in engagement with the same tooth as it was initially and no rotation of the sleeve nut takes place.

The tooth with which the pawl was initially in engagement is indicated at X in each of the figures.

If there has been appreciable wear of the friction pad then the movement of the lever required to bring the pad into engagement with the disc is sufficient to cause the pawl to ride over a tooth of the ratchet as shown in FIGURE 10. In the next part of the lever movement there is no additional relative movement between the pawl and the ratchet teeth as the boss 25 is rolling on the outer end of the thrust member, so that any deformation of the caliper or other parts under load does not carry the pawl over another tooth. This is shown in FIGURE 11.

Finally when the brake is released and the lever and thrust member return to their normal positions as shown in FIGURE 12 the pawl moves the nut member angularly through one tooth spacing to increase the effective length of the thrust member by an amount sufficient to compensate for the wear of the friction pad.

If the application of the bzrake is maintained for a prolonged period there is a possibility of the friction pad swelling and maintaining an axial load on the thrust member when the brake is released and the spring 41 shown in FIGURES 3 and 4 allows the thrust member to move transversely within the sleeve in a direction opposite to that in which it is normally moved by the lever so that damage to the pawl is avoided.

In the modification shown in FIGURES 13, 14 and 15, the shell 28 is omitted and the thrust member comprising the sleeve nut 26 and plunger 27 is mounted directly in a bore 45 in the caliper.

The bore is of substantially greater diameter than the sleeve nut which is normally held in engagement with spaced longitudinal ribs 46 in the bore by an arcuate spring 47 having fingers bearing respectively on the surfaces of the nut and the bore.

The spring also provides frictional resistance to rotation of the nut member. In this case the pawl 33 is made sufficiently resilient to allow it to yield without damage if the axial load on the thrust member is maintained by pad swell when the brake is released.

Another modification is shown in FIGURES 16 to 20. In this case the thrust member comprises a sleeve nut 51 with which a plunger 52 is in screw-threaded engagement. The inner end of the plunger has a tapered and radiused nose in rocking engagement with a recess 53 in the friction pad 10. The outer end of the sleeve nut has a central spigot 54 which is received in an opening in a spring blade 55 fixed to a rigid rocking lever 56 which rocks about a stationary fulcrum 57. An arcuate boss 58 on the inner face of the lever bears on the outer face of the spigot 54 with which it is maintained in rolling contact by the spring blade 55.

The lever is actuated by a piston 59 working in an hydraulic cylinder 61 and may also be actuated by a cam as in the arrangements described above. The lever is urged into the off position by a spring 62.

Ratchet teeth 63 are formed on a peripheral zone of the outer end of the sleeve nut and co-operate with the pawl 64 which is independent of the lever. The pawl rocks about a fixed pivot which may coincide with the lever fulcrum and is loaded by a spring 65 which normally holds a stop lug 66 on the pawl in engagement with the abutment.

In the off position of the mechanism the thrust member is inclined at an acute angle to the plane of the disc as shown in FIGURE 16. When the lever is moved angularly to apply the brake the boss 58 on the lever rolls on the outer end of the thrust member which is rocked over towards the position shown in FIGURE 18, and in the initial part of the movement the engagement of the pawl with the ratchet teeth rotates the sleeve nut through a corresponding angle. When the friction pad has been brought into engagement with the disc the axial load on the thrust member increases its resistance to rotation and the pawl yields as shown in FIGURE 19 against the action of the spring 65 so that there is no additional rotation of the sleeve nut.

Then on release of the brake the parts return to their original positions as shown in FIGURE 20, and if the relative movement between the pawl and the ratchet teeth in the initial part of the brake application has been sufficent to carry one or more ratchet teeth past the pawl the sleeve nut will be retained in an adjusted position.

In this case the direction of the ratchet teeth is such that the adjustment is effected during the application of the brake and the adjustment is not sensitive to deflection or deformation of the caliper under load.

In an alternative arrangement the direction of the ratchet teeth may be reversed in which case adjustment is effected on the return movement of the mechanism but the adjustment is then sensitive to structure deflection.

In a modification the angular movement of the nut part of the thrust member in any of the arrangements described above may be effected through a slipping clutch device instead of through ratchet and pawl mechanism.

In all the arrangements described above it will be appreciated that as the brake is applied the line of action of the lever on the thrust member can be designed to move relative to the fulcrum or pivot about which the lever rocks so that the velocity ratio between the actuating means and the friction pad changes.

This can be used to compensate for the transfer of weight from the rear wheels of a vehicle to the front wheels when the vehicle is being decelerated.

The arrangement of the mechanism for applying the brakes on the front and rear wheels respectively of a vehicle may for example be such that the velocity ratio of the mechanism for applying the brakes on the front wheels increases wtih rate of deceleration while the velocity ratio of the mechanism for applying the brakes on the rear wheels remains substantially constant.

It will also be appreciated that the lever through which the applying force is transmitted from the actuator through the thrust member to the friction pad is relatively small and extremely rigid and provides a high multiplication of the applying force so that the hydraulic actuating piston can be of small diameter and the mechanism is highly sensitive to pad clearance.

In each of the embodiments illustrated the lever is of the first order but a lever of the second order can equally well be employed.

I claim:

1. In a vehicle brake including a rotatable braking member and at least one friction element having a rear side and a front side adapted to be urged into braking engagement with said rotatable member, means for applying the friction element to the rotatable member comprising a rigid lever, a fulcrum about which said lever is angularly movable, actuating means operating on said lever on one side of said fulcrum for effecting movement thereof about said fulcrum in a brake applying direction, a thrust member having an inner end and an outer end, and means interposed between the inner end of said thrust member and the rear side of said friction element for rockingly supporting the inner end of said thrust member for angular movement of said member about a substantially fixed point relative to the rear side of the fixed element, said lever including a shaped part on the side of said lever adjacent said thrust member and directly engaging the outer end of said thrust member, said part being constructed and arranged that during at least a part of the movement of said lever about the fulcrum in a brake applying direction said shaped part has rolling engagement with the outer end of said thrust member and the latter is rocked transversely to the line of action of the lever on the thrust member.

2. The vehicle brake of claim 1 including resilient means at all times opposing rocking movement of said thrust member, said resilient means being of predetermined strength so as to yield to a transverse force imposed by said lever on said thrust member in excess of the opposing force of said resilient means as the end of said lever rolls on said thrust member during a part of the brake applying movement of said lever.

3. The brake of claim 1 wherein said thrust member includes first and second parts movable relative to each other to adjust the length of said member, and means cooperating with said lever and one of said parts to move it relative to the other to increase the length of said thrust member when the relative movement between said lever and said thrust member exceeds a predetermined value as the friction element wears.

4. Means as in claim 3 wherein said first and second parts are in screw-threaded engagement with each other, a ring of ratchet teeth on one of said parts, and a pawl movable by said lever in the application of the brake, said pawl being constructed and arranged to engage successive teeth upon predetermined rolling movement of the shaped part of said lever on said thrust member.

5. In a vehicle brake including a rotatable braking member and at least one friction element having a rear side and a front side adapted to be urged into braking engagement with said rotatable member, means for applying the friction element to the rotatable member comprising a rigid lever, a fulcrum about which said lever is angularly movable, actuating means operating on said lever on one side of said fulcrum for effecting movement thereof about said fulcrum in a brake-applying direction, a thrust member having an inner and an outer end, means interposed between the inner end of said thrust member on the rear side of said friction element for rockingly supporting the inner end of said thrust member for angular movement of said member about a substantially fixed point relative to the rear side of the friction element, said lever including a shaped part on the side of said lever adjacent to said thrust member and directly engaging the outer end of said thrust member, and resilient means of predetermined strength at all times opposing rocking movement of said thrust member and cooperating with the latter to retain it in substantially the same angular position with respect to said friction element during its initial movement into engagement with said brake disc whereby the shaped part of said lever has sliding engagement with the outer end of said thrust member, said resilient means thereafter yielding when said lever applies a braking load to said thrust member and thereby exerts a transverse force thereon in excess of the strength of said resilient means whereby said thrust member is rocked by said lever transversely to the line of action of said lever and the latter has rolling engagement with said thrust member.

6. Means as in claim 5 wherein the thrust number includes first and second parts in screw-threaded engagement with each other and relatively movable to adjust the effective length of said thrust member, a ring of ratchet teeth on one of said parts, a pawl movable by said lever and arranged to engage with successive ratchet teeth upon predetermined movement of said lever on said thrust member to effect relative movement of the parts of said thrust member to increase the effective length thereof as the friction element wears.

7. Means as in claim 6 wherein one of said parts of said thrust member is a sleeve nut and the second part is a plunger in screw-threaded engagement with said nut, an open-ended cylindrical sleeve of greater diameter than said sleeve nut and in which said nut is received, said sleeve limiting the transverse rocking movement of said thrust member by said lever.

8. Means as in claim 7 including second resilient means acting on said sleeve and said nut to afford frictional resistance against rotational movement of said nut with respect to said sleeve.

9. Means as in claim 6 wherein said pawl is constructed and arranged to engage said teeth upon predetermined sliding movement of said lever on said thrust member.

10. In a vehicle brake including a rotatable braking member and at least one friction element having a rear side and a front side adapted to be urged into braking engagement with said rotatable member, means for applying the friction element to the rotatable member comprising a rigid lever, a fulcrum about which said lever is angularly movable, actuating means operating on said lever on one side of said fulcrum for effecting movement thereof about said fulcrum in a brake applying direction, a thrust member having an inner and an outer end, means interposed between the inner end of said thrust member in the rear side of said friction element for rockingly supporting the inner end of said thrust member for angular movement of said member about a substantially fixed point relative to the rear side of the friction element, said lever including an arcuate part on the side of said lever adjacent said thrust member and directly engaging the outer end of said thrust member, said parts being constructed and arranged that during movement of said lever about the fulcrum in a brake applying direction said arcuate part has rolling engagement with the outer end of said thrust member and the latter is rocked transversely to the line of action of the lever on the thrust member, and resilient means acting on said lever to maintain the arcuate part thereof at all times in rolling contact with said thrust member.

References Cited by the Examiner

UNITED STATES PATENTS

| 1,547,889 | 7/1925 | Waseige | 188—152 |
| 2,242,297 | 5/1941 | Freeman | 188—152 |
| 2,263,505 | 11/1941 | Lambert | 188—72 |
| 2,669,327 | 2/1954 | Chamberlain et al. | 188—72 |
| 2,768,710 | 10/1956 | Butler | 188—152 X |
| 2,940,554 | 6/1960 | Cameron | 188—196 X |
| 2,961,072 | 11/1960 | Nothstine | 188—152 X |
| 3,059,731 | 10/1962 | Gancel et al. | 188—73 |
| 3,111,198 | 11/1963 | Hodkinson | 188—72 |
| 3,145,806 | 8/1964 | Gancel | 188—73 |
| 3,145,807 | 8/1964 | Desvignes et al. | 188—73 |
| 3,169,608 | 2/1965 | Press et al. | 188—72 |

FOREIGN PATENTS

| 1,142,643 | 4/1957 | France. |
| 728,376 | 4/1955 | Great Britain. |
| 734,271 | 7/1955 | Great Britain. |

MILTON BUCHLER, *Primary Examiner.*

ARTHUR L. LA POINT, *Examiner.*

G. E. A. HALVOSA, *Assistant Examiner.*